United States Patent [19]

Hoffman

[11] 4,440,706
[45] Apr. 3, 1984

[54] ISOSTATIC MOLDING OF TWO-TERMINAL CERAMIC INSULATOR

[75] Inventor: James S. Hoffman, Grand Blanc, Mich.

[73] Assignee: General Motors Corporation, Detroit, Mich.

[21] Appl. No.: 271,508

[22] Filed: Jun. 8, 1981

[51] Int. Cl.³ .............................................. C04B 37/00
[52] U.S. Cl. ...................................... 264/56; 264/61; 264/570
[58] Field of Search ........................... 264/56, 61, 570

[56] References Cited

U.S. PATENT DOCUMENTS

| | | | |
|---|---|---|---|
| 3,034,191 | 5/1962 | Schaefer et al. | 25/45 |
| 3,499,066 | 3/1970 | Murray | 264/56 |
| 3,502,755 | 3/1970 | Murray | 264/56 |

Primary Examiner—James H. Derrington
Attorney, Agent, or Firm—Douglas D. Fekete

[57] ABSTRACT

A ceramic insulator body for receiving and electrically isolating two parallel terminal rods is manufactured by radial isostatic compaction of a ceramic powder about a core member having an hourglass cross section. The core member produces a bore comprising two parallel terminal-receiving channels connected by a constricted passage that is sized and shaped to space apart two terminal rods in the channels.

3 Claims, 6 Drawing Figures

ISOSTATIC MOLDING OF TWO-TERMINAL CERAMIC INSULATOR

BACKGROUND OF THE INVENTION

This invention relates to a method for molding a ceramic insulator by radial isostatic compaction, which insulator is adapted to receive and insulate two terminals in spaced, parallel relationship.

U.S. Pat. No. 3,034,191, issued to Schaefer in 1962, describes an apparatus and method for molding a ceramic insulator by isostatic compaction. Ceramic powder is confined within a cavity in a soft rubber mold and subjected to compaction forces directed radially toward a center axis. A core that is supported at one end protrudes into the powder along the axis to form a central circular bore for receiving a single terminal rod. The compact is removed from the mold and fired to produce the insulator.

While the method in Schaefer is well-suited for forming a ceramic insulator to protect a single center terminal, for example, a spark plug insulator, the method has not been applicable to forming ceramic bodies for insulating two parallel, spaced terminals. When two cores are axially positioned in the mold cavity, at least one is offcenter and both may be offcenter if a symmetrical arrangement is desired. The extremely high radial compaction forces deflect the offcenter core towards the center. Because the core is supported only at one end, deflection is greatest at the unsupported end so that the core curves toward the center axis. After the forces are relieved, the core may damage the compact as it tends to straighten. Furthermore, the curvature causes problems in removing the core and in inserting a straight terminal rod into the bore.

Therefore, it is an object of this invention to provide a method for forming a ceramic insulator body by an isostatic molding process wherein ceramic powder is subjected to compaction forces directed radially towards a center axis, which ceramic body is adapted to receive and insulate two terminal rods in spaced relation parallel to each other and to the compaction axis. The method involves employing a single axial core to form a bore having two terminal-receiving channels that are connected in a manner that defines an insulating space between the rods.

BRIEF SUMMARY OF THE INVENTION

In a preferred embodiment, a radial isostatic compaction method of this invention employs a single axial core to form in a single bore having a figure-8 or peanut-shaped cross section. The bore is sized and shaped such that, after shrinkage during firing, the enlarged round end channels are each adapted to receive one terminal rod and the constriction between the channels defines an insulating space between the rods. The core is formed of a single member having a corresponding cross section and is positioned such that the constricted portion extends along the center axis in the mold. Thus, the radial compaction forces are substantially balanced to prevent the core from being deflected during compaction.

DETAILED DESCRIPTION OF THE INVENTION

Figure 1:
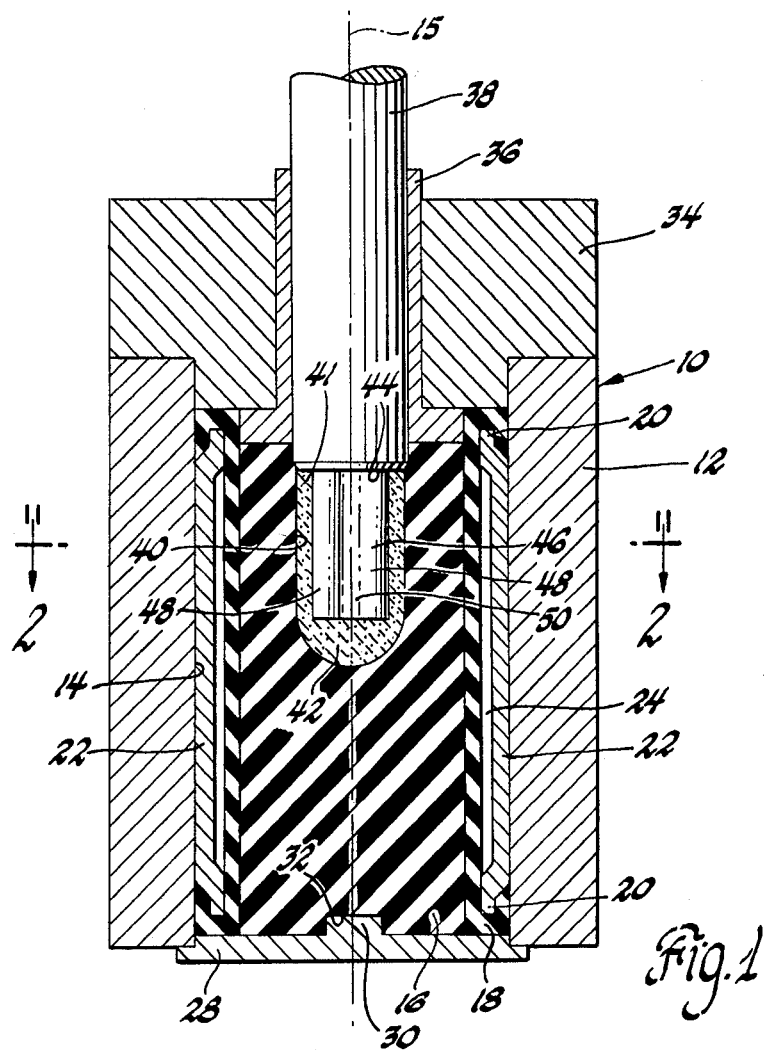
FIG. 1 is a longitudinal sectional view of an isostatic molding apparatus, taken along line 1—1 in FIG. 2, showing the central core in position in the mold.
Figure 2:
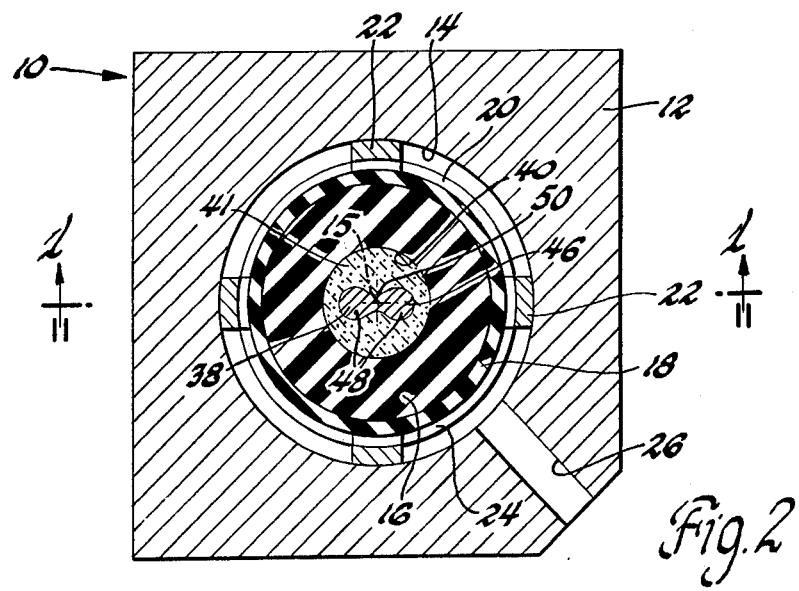
FIG. 2 is a transverse sectional view of the apparatus of FIG. 1 taken along the line 2—2.

Referring to FIGS. 1 and 2, an isostatic molding apparatus 10 comprises a steel mold retainer 12 having a cylindrical bore 14 about a longitudinal axis 15. Positioned within bore 14 is a coaxial cylindrical mold 16 formed of a soft rubber material capable of transmitting pressure. Immediately about mold 16 is a rubber sleeve 18 whose edges sealingly overlap steel rings 20 that are spaced apart by axial ribs 22. A space 24 about sleeve 18 is adapted to receive a hydraulic fluid introduced under pressure through a passage 26 for applying compaction force to the mold. Bore 14 is closed by a bottom end wall 28 having a central projection 30 adapted to securely fit into a recess 32 in mold 16 to center the mold in bore 14.

Bore 14 is covered by a top wall 34. A cylindrical steel sleeve 36 extends coaxially through wall 34 and abuts mold 16 to constrain the mold. Apparatus 10 also comprises a die 38 that is movable through sleeve 36 along axis 15 between a lower position for molding operations, shown in FIG. 1, and an upper position, not shown, wherein die 38 is withdrawn from the mold for removing a compact.

Mold 16 defines a cavity 40 having a cylindrical upper portion 41 and a semispherical lower portion 42. Cavity 40 is depicted in the Figures containing ceramic powder. During molding cavity 40 is closed by end 44 of die 38. Affixed to die end 44 is a core 46 that extends axially into cavity 40. As seen in FIG. 2, core 46 has a peanut-shaped cross section formed of two outer lobe portions 48 connected by a constricted portion 50. Core 46 is centered in cavity 40 such that constriction 50 lies along axis 15 and extends through cylindrical portion 41, but not into portion 42. The semispherical contour of portion 42 produces more uniform compaction forces near the unsupported tip of core 46.

Ceramic bodies are formed in apparatus 10 by filling cavity 40 with an alumina powder containing 2% by weight glycol binder. Die 38 is lowered into the position shown in FIG. 1, driving core 46 into the powder. Hydraulic fluid in passage 26 and space 24 is pressurized to about 4000 psi to squeeze rubber mold 16 and press the powder into a compact. The pressure is directed radially towards axis 15 and forms the powder against core 46. After compaction, the pressure is relieved and die 38 is raised, whereupon the compact is held in core 46 by friction and carried out mold 16. The compact is then slid off core 46 by hand.

Figure 3:
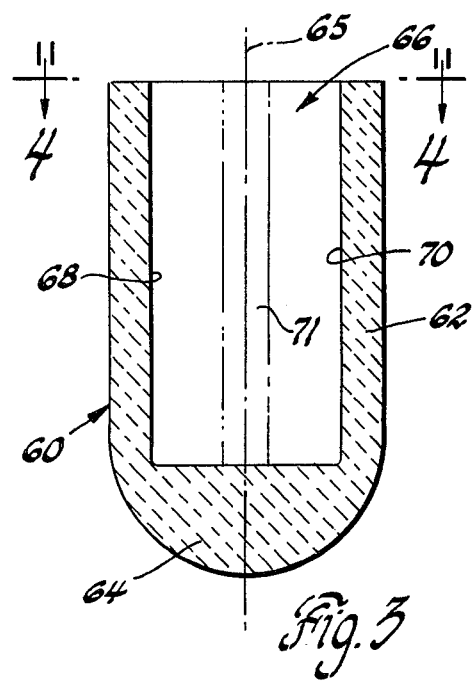
FIG. 3 is a longitudinal sectional view of a ceramic compact formed by the apparatus in FIG. 1 and taken along line 3—3 in FIG. 4.
Figure 4:
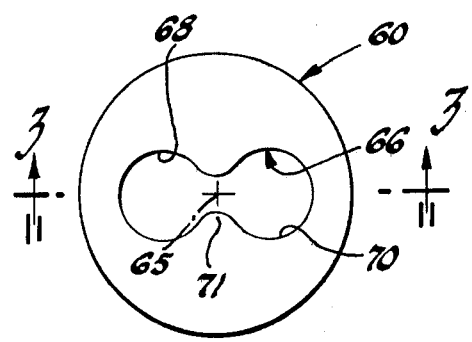
FIG. 4 is a plan view of the compact in FIG. 3 taken along the line 4—4 and showing the bore cross section.

As seen in FIGS. 3 and 4, product compact 60 has the shape of cavity 40 and thus comprises a cylindrical portion 62 and a semispherical portion 64. Center axis 65 of cylindrical portion 62 corresponds to axis 15 during compaction. Compact 60 also has an axial bore 66 formed by core 46 and comprising parallel round end terminal channels 68 and 70 and a constricted connection 71.

Compact 60 is machined to grind down the outer diameter of cylindrical portion 62 and to grind away portion 64 to open bore 66 there. The machined compact is sintered to form a strong ceramic insulator body 72 in FIGS. 5 and 6. Body 72 is generally cylindrical about axis 74, which corresponds to compact axis 65 in FIGS. 3 and 4. Axial bore 76 has a peanut-shaped cross section that includes parallel outer channels 78 and a constricted connection 80. Thus, bore 76 is shaped similar to core 46 and bore 66, but has significantly smaller dimensions as the result of shrinkage of the ceramic during sintering.

Figure 6:
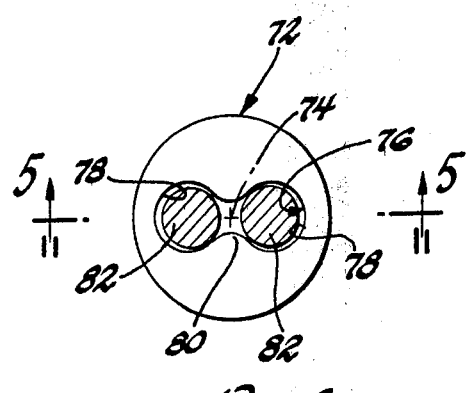
FIG. 6 is a plan view of the insulator body in FIG. 5 taken along the line 6—6 and showing the interrelationship between the bore and the rods.

Two electrically conductive metallic rods 82 are inserted axially through bore 76 such that one rod is received in each channel 78. As seen in FIG. 6, constriction 80 prevents contact by rods 82. Whereas the round channels 78 have diameters greater than rods 82, constriction 80 is narrower than the rod diameters so that each rod is trapped in the channel where inserted. Also, constriction 80 has an interchannel dimension sufficient to space the round rods 82 apart, even though the rods are adjacent the constriction, as in FIG. 6. Obviously, rods 82 may be positioned in channel 78 elsewhere than depicted. However, a principal advantage of bore 76 is that rods 82 are spaced apart and insulated when loosely held or imprecisely positioned in channels 78. Thus, constriction 80 is preferably sized to define an insulating space between rods 82 no matter what their relative position.

Figure 5:
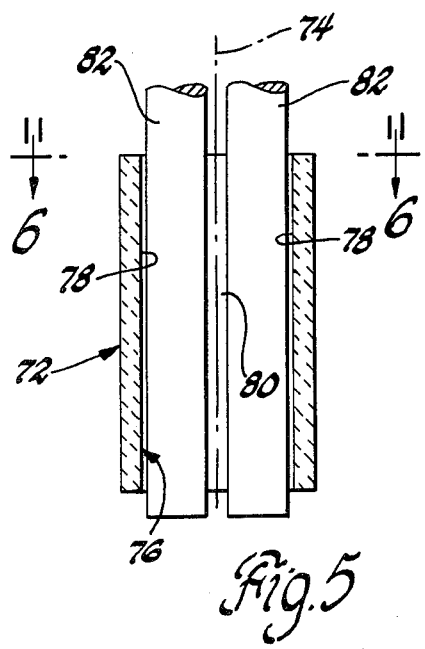
FIG. 5 is a cross-sectional view of a ceramic insulator body formed by machining the compact in FIG. 2, taken along line 5—5 in FIG. 6, and showing two terminal rods positioned therein.

FIGS. 5 and 6 show bore 76 containing air between rods 82 in constriction 80 and about rods 82 in channels 78. Although air provides adequate insulation, it is apparent that the voids between and about rods 82 may be filled with nongaseous insulating materials, such as nonconductive sealing glass, which also holds rods 82 in place during use.

While this invention has been disclosed in terms of a particular embodiment thereof, it is appreciated that numerous minor changes may be made without departing from the spirit and scope of the invention as defined in the following claims.

The embodiments of the invention in which an exclusive property or privilege is claimed are defined as follows:

1. A method for manufacturing a ceramic electrical insulator body adapted to receive and electrically isolate two parallel conductive rods, said method comprising compacting ceramic powder by directing isostatic pressure radially towards an axis to press said powder about an axial core and to thereby form a self-sustaining body defining a bore derived from said core, said bore comprising parallel enlarged channels derived from axially parallel core sections that are longitudinally connected to maintain the core sections in a desired parallel relationship despite the radial compaction pressure, whereupon the connection forms an opening between channels, and firing the compact body to form a dense insulator body having channels derived from the enlarged bore channels in the compact body and adapted to each receive a conductive rod, said firing resulting in shrinkage of the channel-connecting opening to a size sufficient to prevent contact between rods received in each channel to thereby electrically isolate the rods.

2. A method for manufacturing a dense ceramic insulator body having two parallel channels sized and positioned each for receiving a conductive rod of a predetermined diameter and for electrically isolating the rods within the channels, said method comprising compacting a loose body of ceramic powder about a core by directing forces radially toward an axis through the core to form a self-sustaining body defining a bore derived from the core, said bore comprising axially parallel elongated regions having enlarged cross sections and adapted for forming in the compact body a basis for parallel rod-receiving channels in the dense insulator body, said enlarged bore regions being derived from corresponding axially parallel, enlarged portions of the core, said core further comprising a portion lying along the compaction axis and joining the enlarged portion to maintain a desired parallel relationship despite the compaction forces, said coaxial core portion being narrower in cross section than the enlarged portion and resulting in a constricted opening between the enlarged regions of the bore, and sintering the compact body to densify the ceramic to form the insulator body having parallel rod-receiving channels, said densification further constricting the interchannel opening to a size less than either rod diameter and for an interchannel distance sufficient to prevent electrical contact between rods received in the channels.

3. A method for manufacturing a dense ceramic insulator body having two parallel channels sized and positioned each for receiving a conductive rod of a predetermined diameter and for electrically isolating the rods within the channels, said method comprising filling a cavity defined by a rubber-like compression mold with a ceramic powder suitable for compaction to form a self-sustaining body, said cavity being generally cylindrical about a center axis, said mold being generally cylindrical about the cavity axis and adapted to be radially compressed toward the axis to radially compress the cavity, embedding a rigid, elongated core into the powder within the mold, said core having a substantially figure-8 shaped cross section comprising enlarged round end portions and a constricted intermediate portion, said core being rigidly supported at one end and extending into the powder such that the constricted portion lies along the compaction axis and the enlarged portions are axially parallel, applying ambient hydraulic pressure to the mold to radially compress the mold to compact powder within the cavity against the core to form a generally cylindrical self-sustaining body, whereupon said intermediate core portion maintains the enlarged portions in a desired parallel relationship, removing the self-sustaining body from the mold, removing the core from the self-sustaining body to form therein a bore having a figure-8 cross sectional shape corresponding to the core, said bore comprising axially parallel channels derived from the enlarged end portions of the core and forming a basis for rod-receiving channels in the body, said channels being connected by a coaxial opening derived from the intermediate core portion and cross-sectionally constricted with respect to said enlarged channels, and sintering the compact body to densify the ceramic to substantially form the insulator body, said sintering reducing the bore size while retaining the substantially figure-8 cross section, each enlarged bore channel being thereby suitably sized greater than a rod diameter and adapted to receive one conductive rod, said opening between said channels being further constricted to a size less than the rod diameter for an interchannel dimension sufficient to prevent contact between rods in the channels to thereby electrically isolate the rods within the insulator body.

* * * * *